US007505968B2

(12) United States Patent
Beres et al.

(10) Patent No.: US 7,505,968 B2
(45) Date of Patent: Mar. 17, 2009

(54) EVALUATING THE RELEVANCE OF DOCUMENTS AND SYSTEMS AND METHODS THEREFOR

(75) Inventors: Timothy E. Beres, Boulder, CO (US); William J. Wirth, Thornton, CO (US)

(73) Assignee: ZD Acquisition, LLC, Santa Ana, CA (US)

( * ) Notice: Subject to any disclaimer, the term of this patent is extended or adjusted under 35 U.S.C. 154(b) by 511 days.

(21) Appl. No.: 10/876,250

(22) Filed: Jun. 23, 2004

(65) Prior Publication Data

US 2005/0209987 A1 Sep. 22, 2005

Related U.S. Application Data

(63) Continuation-in-part of application No. 10/804,472, filed on Mar. 18, 2004, now abandoned, and a continuation-in-part of application No. 10/804,468, filed on Mar. 18, 2004, now Pat. No. 7,324,998.

(51) Int. Cl.
  *G06F 17/30* (2006.01)
(52) U.S. Cl. ............... 707/5; 707/102; 715/200; 715/201
(58) Field of Classification Search ........... 707/1–5, 707/10, 100–102, 104.1, 203; 709/201; 715/200, 715/201, 204, 209, 222, 229, 235
See application file for complete search history.

(56) References Cited

U.S. PATENT DOCUMENTS

| 5,521,815 | A | | 5/1996 | Rose, Jr. ........................ 705/28 |
| 5,781,773 | A | * | 7/1998 | Vanderpool et al. .......... 707/100 |
| 6,012,053 | A | * | 1/2000 | Pant et al. ....................... 707/3 |
| 6,076,064 | A | | 6/2000 | Rose, Jr. .......................... 705/1 |
| 6,237,011 | B1 | * | 5/2001 | Ferguson et al. ............. 715/515 |
| 7,131,069 | B1 | * | 10/2006 | Rush et al. .................... 715/738 |
| 2002/0032626 | A1 | * | 3/2002 | DeWolf et al. ................ 705/35 |
| 2002/0035535 | A1 | | 3/2002 | Brock, Sr. ..................... 705/37 |
| 2002/0073112 | A1 | | 6/2002 | Kariya ......................... 715/500 |
| 2002/0123989 | A1 | * | 9/2002 | Kopelman et al. .............. 707/3 |
| 2003/0036922 | A1 | * | 2/2003 | Fries .............................. 705/1 |
| 2004/0059653 | A1 | | 3/2004 | Verkuylen .................... 705/35 |
| 2004/0153432 | A1 | | 8/2004 | O'Halloran | |
| 2005/0210040 | A1 | * | 9/2005 | Beres et al. ................. 707/100 |

* cited by examiner

*Primary Examiner*—Cheryl Lewis
(74) *Attorney, Agent, or Firm*—Townsend and Townsend and Crew LLP (57) ABSTRACT

A method of evaluating a particular document relating to property includes selecting the particular document from a set of pre-selected documents. Each pre-selected document has associated therewith one or more search linkages that identify how the pre-selected document was selected, using user-supplied inputs, from a larger set of documents relating to property. The method also includes using the one or more search linkages associated with the particular document to determine a relevance factor associated with the document. The method further includes displaying to a user information relating to the document.

43 Claims, 4 Drawing Sheets

| Results -- Kept=12; Removed=0; TOTAL=12 | | | | | | | |
|---|---|---|---|---|---|---|---|
| Record Date | Recep# | DocType | DocCategory | Relevance | Grantee(s) | Grantor(s) | LegalDescription |
| 2/2/01 | 01-004688 | DEED WARRANTY | CONVEYANCE | 94 | LOUISE M ECKE | VISTANA WGV, LTD | RESORT AT WORLD GOLF VILLAGE CONDOMINIUM |
| 1/25/02 | 02-004924 | RELEASE OF MO | RELEASE | 75 | LOUISE M ECKE | SPECIAL LIQUIDATOR | |
| 6/19/01 | 01-030434 | ASSIGNMENT OF | ASSIGNMENT | 75 | FINOVA CAPITAL | VISTANA WGV, LTD | |
| 2/2/01 | 01-004689 | MORTGAGE | MORTGAGE | 74 | VISTANA WGV, LT | RAYMOND J. ECKE | WEEK(s) 38 TS EVEN LOT 111 VISTANA RESORT AT WORLD GOLF VILLAGE COND. |
| 6/29/99 | V00000_BO | MISCELLANEOUS | MAP | 65 | | | VISTANA RESORT AT WORLD GOLF VILLAGE CONDOMINIUM ENTIRE_SECTION TAL... |
| 6/21/02 | 02-036483 | ASSIGNMENT OF | ASSIGNMENT | 60 | VISTANA WGV, LT | FINOVA CAPITAL CORP. | VISTANA RESORT AT WORLD GOLF VILLAGE CONDOMINIUM |
| 9/12/02 | 02-053320 | MISCELLANEOUS | ASSIGNMENT | 55 | FCC RESORT LLC | VISTANA WGV, LTD | ENTIRE_SECTION TAL... |
| 9/13/99 | 99-044105 | RELEASE OF MO | RELEASE | 50 | SUSAN SICILIANO | ROWE JOHNNY R. OR/10 | VISTANA RESORT AT WORLD GOLF VILLAGE CONDOMINIUM ENTIRE_SECTION TAL... |
| 9/14/01 | 01-047790 | RELEASE OF MO | RELEASE | 45 | PAULA J. HEIGAA | BAY MICHAEL T OR/27 | |
| 6/29/99 | 99-030927 | AMENDED DECL | ENCUMBRANCE | 45 | | VISTA RESORT AT WORLD GOLF | |
| 12/29/00 | 00-056224 | DEED WARRANTY | CONVEYANCE | 44 | MICHAEL J. KOLE | VISTANA WGV, LTD | WEEK(s) 38 TS ODD LOT 111 VISTANA RESORT AT WORLD GOLF VILLAGE COND... |
| 12/29/00 | 00-056225 | MORTGAGE | MORTGAGE | 34 | VISTANA WGV, LT | ROBIN C. KOLBUS | WEEK(s) 38 TS ODD LOT 111 VISTANA RESORT AT WORLD GOLF VILLAGE COND... |

EVALUATING THE RELEVANCE OF DOCUMENTS AND SYSTEMS AND METHODS THEREFOR

CROSS-REFERENCES TO RELATED APPLICATIONS

This application is a continuation-in-part of and claims the benefit of co-pending, commonly-assigned U.S. patent application Ser. No. 10/804,468, entitled "DOCUMENT SEARCH METHODS AND SYSTEMS", filed on Mar. 18, 2004, by Beres, et al., and of co-pending, commonly-assigned U.S. patent application Ser. No. 10/804,467, entitled "DOCUMENT ORGANIZATION AND FORMATTING FOR DISPLAY", filed on Mar. 18, 2004, by Beres, et al., the entirety of each of which are herein incorporated by reference for all purposes.

This applications is related to the following co-pending, commonly-assigned U.S. Patent Applications, the entirety of each of which are herein incorporated by reference for all purposes: Provisional U.S. Patent Application No. 60/554,511, entitled "PROPERTY RECORDS DATABASES AND SYSTEMS AND METHODS FOR BUILDING AND MAINTAINING THEM", filed on Mar. 18, 2004; U.S. patent application Ser. No. 10/804,472, entitled "AUTOMATED RECORD SEARCHING AND OUTPUT GENERATION RELATED THERETO", filed on Mar. 18, 2004; Provisional U.S. Patent Application No. 60/554,514, entitled "CONFIDENCE-BASED NATURAL LANGUAGE PARSING", filed on Mar. 18, 2004; and Provisional U.S. Patent Application No. 60/554,513, entitled "CONTEXTUAL CONVERSION OF LANGUAGE TO DATA" filed on Mar. 18, 2004.

BACKGROUND OF THE INVENTION

The present invention relates generally to search systems. More specifically, the present invention relates to systems and methods for evaluating the relevancy of documents identified in a search.

The practice of recording real property transfers is well known. Local governments (e.g., counties) typically administer the recording system. Most any time a property owner transfers an interest in his property, a document evidencing the transfer is recorded in the county where the property is located, thus providing notice to others of who owns what interest in the property. The property owner may transfer all his right, for example, when an individual sells his primary residence, in which case a deed usually is recorded. In another example, a property owner may transfer only a right to foreclose on a mortgage if he does not make required payments, in which case a mortgage may be recorded. Those skilled in the art will appreciate other examples.

Before an entity (grantee) gives value in return for an interest in property, that entity typically desires to confirm that the property owner (grantor) has the right to transfer the interest. It is common practice for title companies to provide this confirmation in the form of "title policies." Essentially an owner's title policy is an insurance policy that insures the grantee against the risk of receiving a defective interest in property. Before issuing a title policy, a title company physically searches recorded property records to create a chain of title and identify potential encumbrances to effective transfer of any of the bundle of rights associated with the subject property. Likewise, before a lender lends money secured by property, the lender typically searches the property records to assess the quality of the collateral. Such lenders purchase a loan policy to insure the lender against the risks of making a loan on a property with potential title problems. These are, of course, but two examples of instances in which searching property records is desirable, albeit probably the most common examples.

For a number of reasons, the process of searching property records is labor intensive. Property records typically are recorded in chronological order, not according to location, thus complicating the task of identifying recorded documents relating to a specific parcel from among the thousands of recorded documents. Further, any given parcel is a subdivided portion of a larger parcel and the property description is not consistent. Further still, a variety of documents are used to record transfers of property interests, and a standard format does not exist. Errors in recorded documents or in the indexing system used to locate the records further compound the problem. Probably most importantly, however, is the lack of an electronic searching system that includes all the information an underwriter may need to know about a parcel before issuing a policy or approving a loan relating to the property.

Another problem inherent in electronic search systems relates to evaluating the relevance of documents identified in a search. On one had, a search system should, ideally with 100% accuracy, identify all relevant documents. In doing so, however, the search system may identify a large number of ultimately irrelevant documents. Thus, a search system should include systems and methods to evaluate the relevancy of returned documents.

Thus, embodiments of the present invention relate to systems and methods for improving the efficiency of property record searches, as well as analyzing and summarizing the results thereof, including systems and methods for evaluating the relevancy of returned documents.

BRIEF SUMMARY OF THE INVENTION

Embodiments of the invention thus provide a method of evaluating a particular document relating to property. The method includes selecting the particular document from a set of pre-selected documents. Each pre-selected document has associated therewith one or more search linkages that identify how the pre-selected document was selected, using user-supplied inputs, from a larger set of documents relating to property. The method also includes using the one or more search linkages associated with the particular document to determine a relevance factor associated with the document. The method further includes displaying to a user information relating to the document. The information includes the relevance factor. The set of pre-selected documents also may have associated therewith one or more organizational linkages, each of which organizational linkages identifies a relationship between at least two pre-selected documents. The method may include using the one or more organizational linkages to determine the relevance factor associated with the particular document.

In some embodiments, using the one or more organizational linkages to determine the relevance factor associated with the particular document may include adjusting a baseline relevance factor if a record date of the particular document predates a specific good stop associated with the document. Using the one or more search linkages associated with the particular document to determine a relevance factor associated with the document may include determining a baseline relevance factor and thereafter adjusting the relevance factor based on one or more specific comparisons. Determining a baseline relevance factor may include assigning a relevance factor of 100 if a location associated with the particular document matches a location supplied by a user. Determining a baseline relevance factor may include assigning a relevance factor of 100 if three or more search linkages exist with respect to the particular document. Determining a baseline relevance factor may include assigning a relevance factor of 92 if two search linkages exist with respect to the particular document. Determining a baseline relevance factor may include assigning a relevance factor of 84. Adjusting the relevance factor based on one or more specific comparisons may include adjusting the baseline relevance factor based on a comparison between a name associated with the particular document and a name supplied by a user. Adjusting the relevance factor based on one or more specific comparisons may include adjusting the baseline relevance factor based on a comparison between a location associated with the particular document and a location supplied by a user. Adjusting the relevance factor based on one or more specific comparisons may include adjusting the baseline relevance factor based on a comparison between an address associated with the particular document and an address supplied by a user. Adjusting the relevance factor based on one or more specific comparisons may include adjusting the baseline relevance factor based on a comparison between a parcel associated with the particular document and a parcel supplied by a user. Adjusting the relevance factor based on one or more specific comparisons may include adjusting the baseline relevance factor if the particular document associates to a good stop. Adjusting the relevance factor based on one or more specific comparisons may include adjusting the baseline relevance factor if the particular document is a mortgage or an assignment of a mortgage associated to a deed. Adjusting the relevance factor based on one or more specific comparisons may include adjusting the baseline relevance factor depending upon a type of document that is the particular document.

Other embodiment of the invention provide a method of selecting documents for inclusion in a title policy or a title abstract. The method includes receiving inputs from a user and using the inputs to select potentially relevant documents from a set of documents relating to property. Using the inputs to select potentially relevant documents creates one or more search linkages associated with each potentially relevant document. Each search linkage relates to a selection method by which the associated document was selected. Using the inputs to select potentially relevant documents creates a set of potentially relevant documents. The method also includes, for a particular document from the set of potentially relevant documents, using one or more search linkages associated with the document to determine a relevance factor relating to the particular document. The method also includes using the relevance factor to determine whether to include the document on a title abstract or title policy. The method may include organizing the set of potentially relevant documents by searching for relationships between documents in the set, thereby creating one or more organizational linkages. Each of which organizational linkages identifies a relationship between at least two documents in the set. The method also may include using the one or more organizational linkages in determining the relevance factor associated with the particular document.

Other embodiments provide a method of selecting documents for inclusion in a report relating to property. The method includes receiving, at a host computer system, user inputs relating to a property records search. The method also includes using the user inputs to select potentially relevant documents from a property records database, each selection of a potentially relevant document thereby creating a search linkage that identifies a selection method by which the potentially relevant document was selected. The method also includes evaluating the potentially relevant documents to determine relationships between one or more documents, each determination of a relationship resulting in an organizational linkage that identifies the relationship. The method further includes using the search linkages and the organizational linkages to calculate a relevance factor for each potentially relevant document. The method also includes, for each potentially relevant document, using the relevance factor to determine whether to include the document in the report and outputting the report.

Still other embodiments provide a system for generating reports relating to property. The system includes a host computer system, a database of property records, means for receiving inputs from a user, and means for outputting the report to the user. The host computer system is programmed to receive user inputs relating to a property records search, use the user inputs to select potentially relevant documents from a property records database, wherein each selection of a potentially relevant document creates a search linkage that identifies a selection method by which the potentially relevant document was selected, evaluate the potentially relevant documents to determine relationships between one or more documents, wherein each determination of a relationship results in an organizational linkage that identifies the relationship, and use the search linkages and the organizational linkages to calculate a relevance factor for each potentially relevant document. The host computer system is also programmed to, for each potentially relevant document, use the relevance factor to determine whether to include the document in the report, and output the report.

Still other embodiments provide a method of selecting documents for inclusion in a report relating to property. The method includes a step for receiving user inputs relating to a property records search, a step for using the user inputs to select potentially relevant documents from a property records database, each selection of a potentially relevant document thereby creating a search linkage that identifies a selection method by which the potentially relevant document was selected, a step for evaluating the potentially relevant documents to determine relationships between one or more documents, each determination of a relationship resulting in an organizational linkage that identifies the relationship, a step for using the search linkages and the organizational linkages to calculate a relevance factor for each potentially relevant document, a step for each potentially relevant document, using the relevance factor to determine whether to include the document in the report, and a step for outputting the report.

Other embodiments provide a computer-readable medium having stored thereon computer-executable instruction for performing a method of selecting documents for inclusion in a report relating to property. The method includes receiving user inputs relating to a property records search, using the user inputs to select potentially relevant documents from a property records database, each selection of a potentially relevant document thereby creating a search linkage that identifies a selection method by which the potentially relevant document was selected, evaluating the potentially relevant documents to determine relationships between one or more documents, each determination of a relationship resulting in an organizational linkage that identifies the relationship, using the search linkages and the organizational linkages to calculate a relevance factor for each potentially relevant document, for each potentially relevant document, using the relevance factor to determine whether to include the document in the report, and outputting the report.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 illustrates an exemplary output screen according to embodiments of the invention.

DETAILED DESCRIPTION OF THE INVENTION

Embodiments of the invention provide systems and methods for evaluating the relevancy of documents identified in a property records search. A document may be highly relevant because, for example, it evidences the most recent transfer of an interest in a specific parcel. A document may be highly irrelevance because, for example, it merely includes the address of the parcel, but has no relationship to the associated ownership interests.

Any number of items may affect a document's relevance. Further, the items may depend on the method by which the document was located. Electronically located documents, for example, may be more or less relevant depending upon the degree to which fields in the document match search criteria. Thus, some embodiments described herein relate to calculating a relevance factor for electronically-selected documents. Further, some embodiments make decisions based on the relevance factors whether certain documents should be included in output associated with the search that located the documents.

Figure 1:
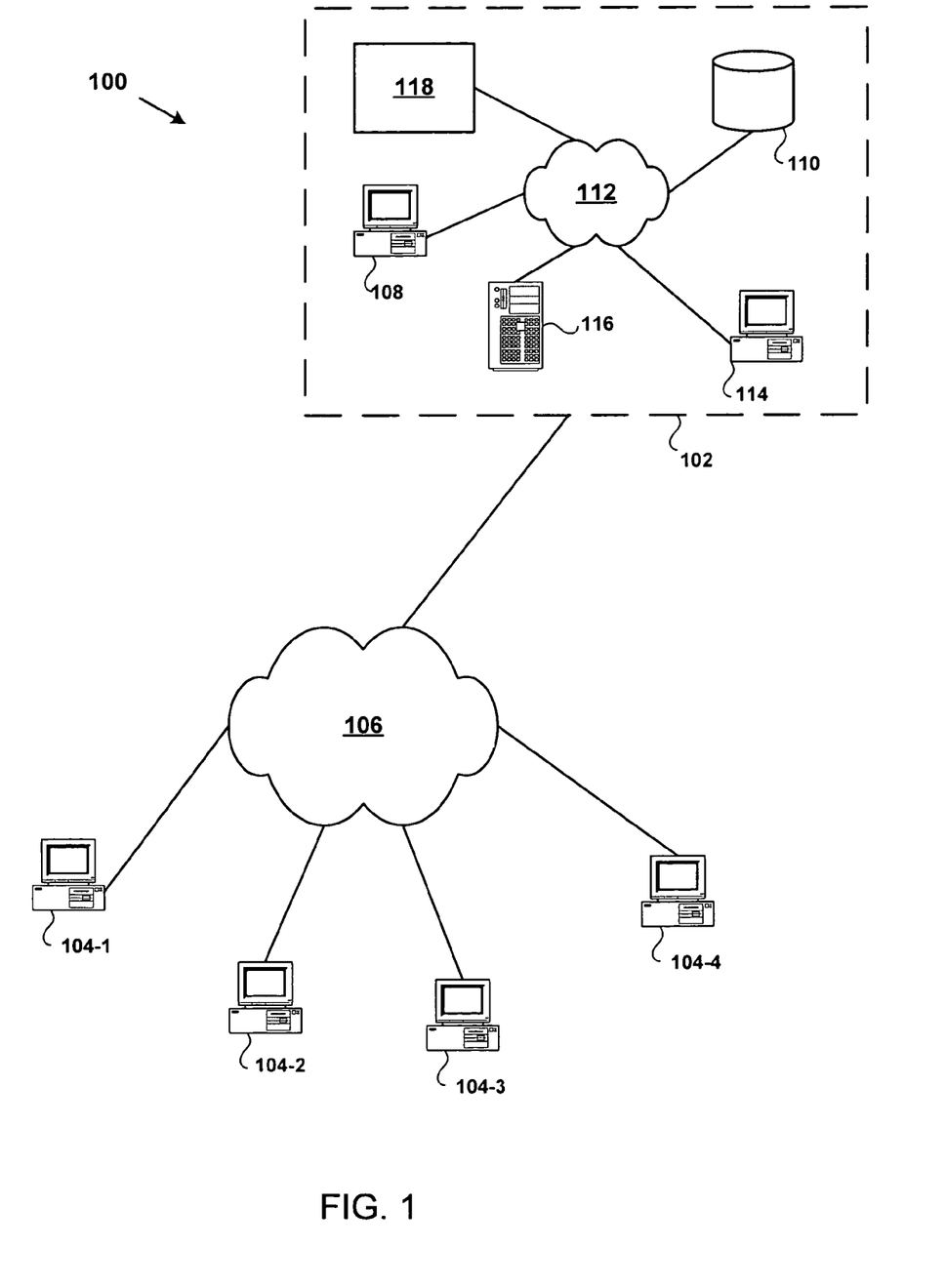
FIG. 1 illustrates a title searching system according to embodiments of the system.

Having described embodiments of the invention generally, attention is directed to FIG. 1, which illustrates an example of a property records searching system 100 according to more specific embodiments of the invention. The system 100 includes a host computer system 102. The host computer system 102 may include any of a number of computing devices, peripheral devices, network devices, input devices, output devices, and the like. All the devices that comprise the host computer system 102 may be co-located at a single facility or distributed geographically. In a specific embodiment, the host computer system 102 is a single computing device that users 104 may access via a network 106. Many other examples are possible.

In a specific embodiment, the host computer system 102 includes a workstation 108, a data storage arrangement 110, and an internal network 112 that allow the two to communicate. The workstation 108 may be any computing device or combination of computing devices capable of performing the processes described herein. The workstation 108 includes a processor and software that programs the processor to operate according to the teachings herein. As is known in the art, the software may be stored on computer-readable media in the form of computer-executable instructions. In some embodiments, the software and may reside on the storage arrangement 110. The storage arrangement 110 may be, for example, any magnetic, electronic, or optical storage system, or any combination of these. The storage arrangement may be a server, or combination of servers having RAM, ROM, hard disk drives, optical drives, magnetic tape systems, and the like or any combination. In some embodiments, each geographic region is represented by a server or group of servers. Many other examples are possible. The internal network 112 may be any of a number of well known wired or wireless networks or combinations thereof. For example, the internal network may be a LAN, WAN, intranet, the Internet, or the like. Many other examples are possible. The host computer system also may include administrative computers 114 (e.g., personal computers, laptop computers, and the like) that may be used to assist in the operation of the system. The host computer system 102 also may include network interfaces 116 (e.g., web server) that enable communication between the host computer system 102 and users 104.

The host computer system 102 also may include an input system 118. In its most basic form, the input system 118 receives source property records, converts the property records to searchable data, and delivers the data to the storage arrangement. This process will be described in greater detail hereinafter. The input system 118 need not be a single device, nor located at a single location.

The network 106 may be any wired or wireless network, or any combination thereof. In a specific embodiment, the network 106 is the Internet. The users 104 may be any computing device capable of providing a user access to the host computer system 102. In a specific embodiment, the user 104-1 is an underwriter's or abstracter's desktop computer through which he accesses the host computer system, via the Internet, for purposes of performing a search and underwriting a policy or loan for a customer.

Those skilled in the art will appreciate that the foregoing is but one example of a system according to embodiments of the invention. Many other examples are possible.

Figure 2:
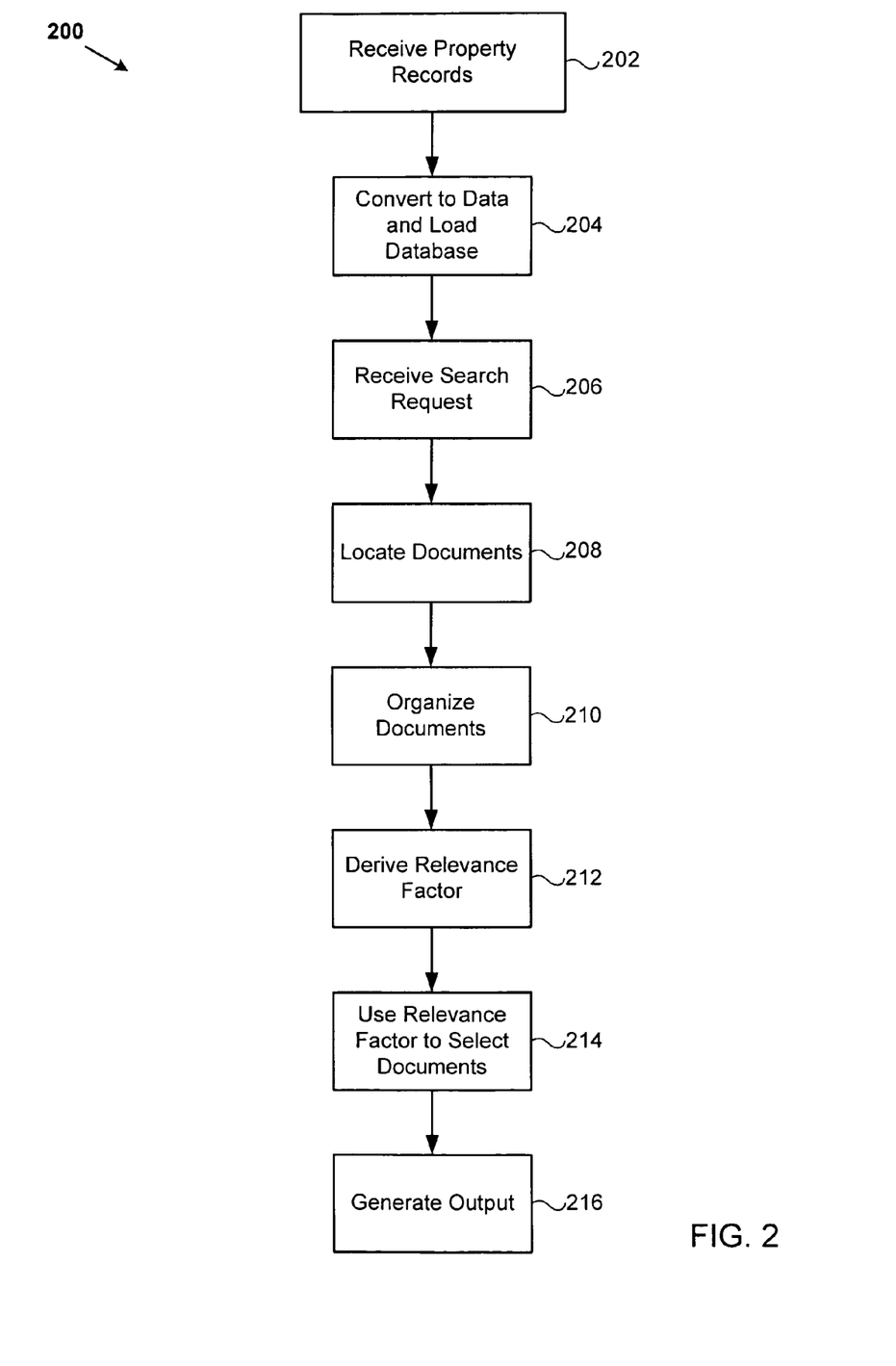
FIG. 2 illustrates a title searching method that includes deriving a relevance factor for selected documents according to embodiments of the invention.

Having described an exemplary system according to embodiments of the invention, attention is directed to FIG. 2, which illustrates an exemplary method 200 according to embodiments of the invention. The method may be implemented in the system 100 described above or in another suitable system. Those skilled in the art will appreciate that alternative methods according to embodiments of the invention may include more or fewer steps and that the steps described herein may be performed in different orders than that described with respect to this exemplary embodiment.

The method 200 begins with the receipt of property records at block 202. The records may be received in any of a number of forms. For example, in some embodiments, the property records are received as paper copies of all documents recorded in a given jurisdiction. In other embodiments, the property records are received as a collection of image files. The image files may be stored in magnetic (e.g., on one or more computer disks) or optical (e.g., on one or more CDs) form, or the like, or a combination of such. The image files may include microfilm or microfiche images. Many other examples are possible. The property records may include deeds, mortgages, liens, releases, and the like.

At block 204, the property records are converted to data and loaded into a database such as the storage arrangement 110 of FIG. 1. This may involve use of the input system 118 of FIG. 1. This process is described in greater detail in previously-incorporated provisional U.S. Patent Application No. 60/554,511.

At block 206, a search request is received. In a specific embodiment, this comprises receiving a request via a network (e.g., the Internet, or other network represented by the network 106 of FIG. 1) from a user, such as one of the users 104 of FIG. 1. The request may comprise one or more data elements on which the user would like to base the search. Exemplary data elements include the property address, a legal description of the property, the grantor in a property transaction, and the like. In some embodiments, the user may supply a specific document (e.g., by providing the reception number of the recorded document) on which the user desires the search to be performed. In a specific embodiment, the inputs include: at least one normalized (i.e., including platted, sectional, and/or metes and bounds information) property location; at least one current property owner name; and/or at least one document identifier (e.g., reception number, instrument number, volume/book/page, and the like). The inputs may include: one or more property address that relate to the normalized property location; and/or one or more parcel identifiers that relate to the normalized property location.

At block 208, potentially-relevant documents are located. This process is described more fully in previously-incorporated U.S. patent application Ser. No. 10/804,468. Briefly, however, this comprises locating within the stored property records documents potentially related to the data elements in the user's request. The documents thus form a set of potentially-relevant documents.

Documents selected for inclusion in the set of potentially-relevant documents include, in a specific embodiment, one or more of the following fields:

- Normalized field data, such as: identifying numbers (reception, instrument, volume/book/page); recordation date; document type/title; other additional data captured in electronic form from a source document;
- Normalized name such as grantor, grantee, third party and/or fourth party information written on the source document and digitally captured and associated to each document;
- Normalized location data such as information written on the source document and digitally captured and associated to each document. This location data may be transformed from the legal description, if any, from each source document;
- Normalized document references written on the source document and digitally captured and associated to each document. This reference data may be transformed from the previous reception/instrument or volume/book/page data found within legal descriptions or otherwise located on the source documents;
- Normalized address(es) written on the source document and digitally captured and associated to each document. This address data may be transformed data found within legal descriptions or otherwise located on the source documents;
- Normalized parcel identificatiers written on the source document and digitally captured and associated to each document. This parcel identification data may be transformed data found within legal descriptions or otherwise located on the source documents.

Each instance of a potentially-relevant document being located results in the creation of a search linkage. A search linkage relates to how the document was selected for inclusion in the potentially relevant document set. For example, if a document was selected for inclusion because of a match or near match with respect to name (i.e., a name on the document matches a name provided by the user), then the resulting search linkage identifies the match to be based on name. Other search linkages may relate to, for example, property address or legal description matches or near matches. Further, matches may with a user-supplied input or with another potentially-relevant document. Further still, search linkages may include a confidence factor that provides some indication of the degree of match between the two elements. Useful purposes relating to the confidence factor will be described in more detail hereinafter.

In a specific embodiment, the search linkages associated with a specific documents include one or more of the following:

- Document found by name match. A confidence number may be associated with this search linkage, e.g. 100% match, or 95% match. Documents are matched by name using the names provided as operator inputs;
- Document found by location match. A confidence number may be associated with this search linkage, e.g. 100% match, or 95% match. Documents are matched by location using the location data provided as operator inputs;
- Document found by hierarchically containing location match. A confidence number may be associated with this search linkage, e.g. 100% match, or 95% match. Documents are matched by location using the location data provided as operator inputs. Hierarchically containing locations are those that are broader in scope than the input locations, but match a broader subset of the data elements in the input locations, e.g. matched on subdivision and block, with no lot.
- Document found by bridged location match. A confidence number may be associated with this search linkage, e.g. 100% match, or 95% match. Documents are matched by bridged location using the location data provided as operator inputs. A bridged location matches as above, but also possesses "bridging" information to an alternate means of representing the location, e.g. the location matches on lot/block/sub, but also contains sectional descriptions of a property.
- Document found by replatted location match. A confidence number may be associated with this search linkage, e.g. 100% match, or 95% match. Documents are matched by replatted location using the location data provided as operator inputs. Re-platted locations are similar to bridged locations, but the location data specifies that, for example, a lot/block/sub was replated from a previous subdivision (and/or lot/block/tract);
- Document found by reference FROM another document;
- Document found by reference TO another document;
- Document found by address match. A confidence number may be associated with this search linkage, e.g. 100% match, or 95% match. Documents are matched by address using the address data provided as operator inputs;
- Document found by parcel identification match. A confidence number may be associated with this search linkage, e.g. 100% match, or 95% match. Documents are matched by address using the address data provided as operator inputs;
- Document found by exact identification match, where the document matches either the operator provided identifiers, or the document matches a document already in the result set exactly, by identifier.

Once located, potentially-relevant documents are organized at block 210. Organizing documents is more fully described in previously-incorporated U.S. patent application Ser. No. 10/804,467. Briefly, however, this involves any of a number of processes that correlate documents in a manner previously accomplished manually. For example, this may involve matching mortgages with mortgage releases, matching liens with lien releases, constructing a chain of title, locating a good stop for a chain of title, matching multiple grantees in a transfer to grantors in a subsequent transfer, and the like. Organizing documents may, in some embodiments, result in organizational linkages that, as with search linkages, provide an indication of the organizational relationship between documents.

At block 212, the search linkages and/or the organizational linkages are used to derive a relevance factor for each document in the set of potentially-relevant documents. The relevance factor may be a number, a letter, or any other identifier that locates the relevance of a document with respect to other documents or criteria. A specific embodiment of a method for deriving a relevance factor is described in more detail hereinafter with respect to FIG. 3.

At block 214, the relevance factor is used to select documents for inclusion in a final report to the user. In some embodiments, the final report is a list of all potentially-relevant documents. The list may include the relevance factor. The user may elect to rank the documents by relevance factor. The user may elect to view only documents over a specific relevance factor or only those within a specific relevance factor range. The user selection may be pre-configured by the user such that at the time of the request the user receives the report without having to make further selections. In some embodiments, the report is provided as a display screen on a display device of the user.

In some embodiments, the report comprises a title policy. In some other embodiments, the report comprises a title abstract. The title policy or title abstract may include summary information from documents having a relevance factor above a certain threshold. The summary information, in some embodiments, includes all information necessary to issue a title policy. The summary information may include the list of potentially-relevant documents or all potentially-relevant documents having a relevance factor above a certain threshold or within a particular relevance factor range.

At block 216, the output is generated. The output may be presented to the user, for example, on a computer display screen, as a printed document, as a facsimile transmission, or the like. In some embodiments, for example, screen-displayed documents, the user may interact with the output. For example, the user may select certain documents from a list of documents to view in greater detail. Other methods of providing output to users are described more fully in previously-incorporated U.S. patent application Ser. No. 10/804,472. One exemplary output screen 400 is pictured in FIG. 4. The output screen 400 includes a list of documents and summary information for each. One summary information item for each is a relevancy factor shown in the column title "Relevance." The list may be sorted on the relevance factor and/or truncated based on the factor. Many other examples are possible and apparent to those skilled in the art in light of the disclosure herein.

Figure 3:
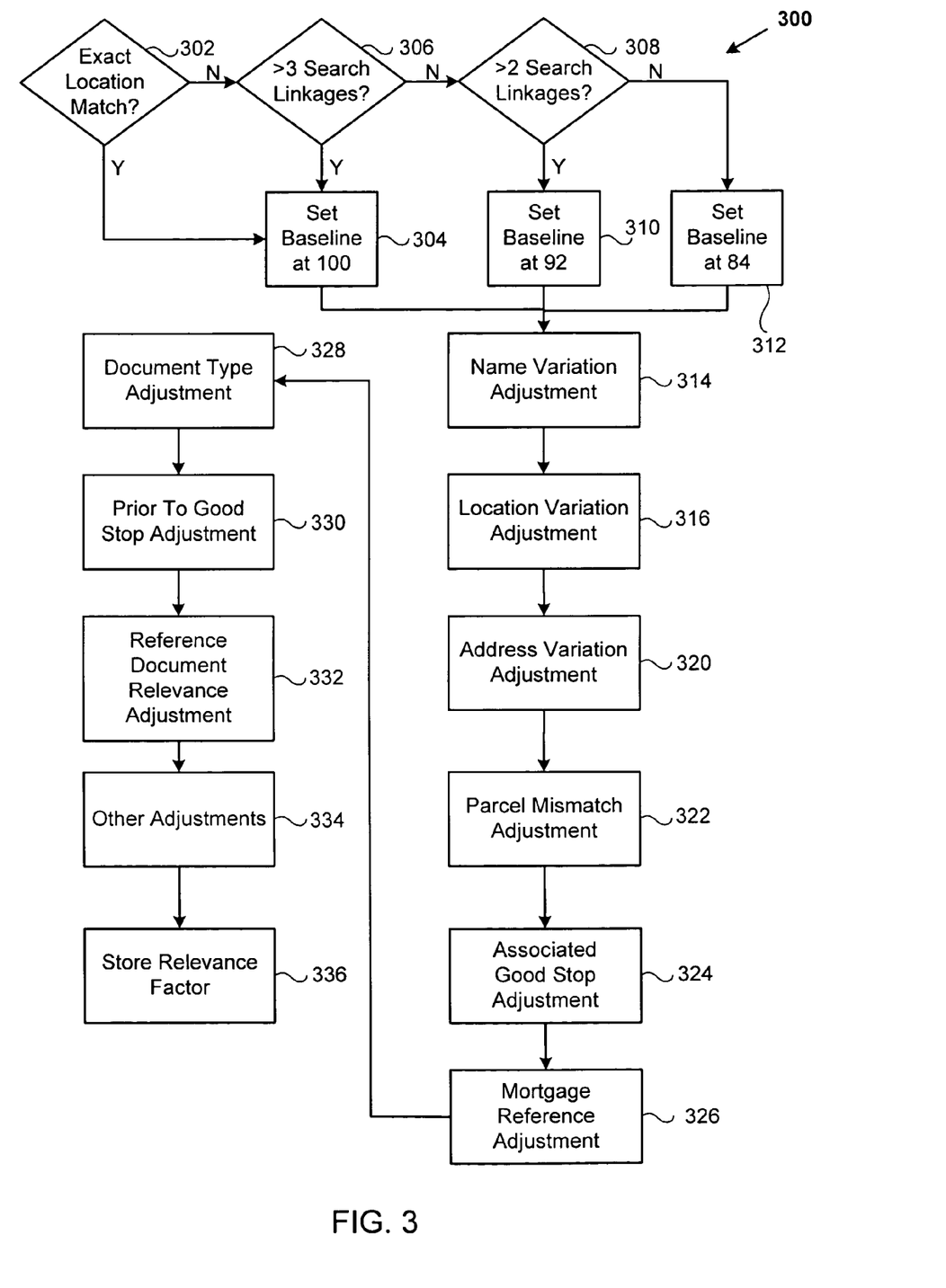
FIG. 3 illustrates an embodiment of a method of deriving a document relevance factor according to embodiments of the invention.

Having described an exemplary method according to embodiments of the invention, attention is directed to FIG. 3, which illustrates a specific embodiment of a method 300 of deriving a relevance factor. This specific embodiment of a method 300 may comprise block 212 of the method 200 described previously with respect to FIG. 2. Thus, in this specific embodiment, search linkages exist for each document in the set of relevant documents. Further, organizational linkages may exist. The method 300 is performed on each document in the set of potentially-relevant documents.

In this exemplary embodiment, the relevance factor comprises a number between 0 and 100 inclusive. The method begins by setting a baseline score or factor. This begins at block 302 wherein the subject document is evaluated based on the location match between the document and the user-supplied criteria. If the location match in exact, then the document is assigned a baseline relevance of 100. If not, the method continues at block 306. At this block, the document is evaluated based on the number of search linkages related to the document (i.e., the number of ways the document was located in the search discussed previously with respect to block 208 of FIG. 2). If the number of search linkages is greater than or equal to 3, then the document is assigned a baseline relevance of 100 at block 304. Otherwise, the process continues at block 308, in which the number of search linkages is compared to 2. If the number of search linkages is equal to 2, then the baseline is set at 92 at block 310. If the number of search linkages is less than 2, then the baseline is set to 84 at block 312. The process thereafter continues with adjustments to the baseline, thus creating a cumulative relevance factor that includes adjustments to the baseline as each is made.

The first adjustment accounts for name variation and takes place at block 314. All document names are compared to the user-supplied name(s). A comparison algorithm may be used to derive a match percentage based on the comparison. If the maximum match percentage is less than 100%, then the variation from 100% is deducted from the cumulative relevance factor, up to a maximum of 20 points. If the document references another document, the comparison includes both the referenced document's names and the source document's names.

The adjustment process continues at block 316. Here, the cumulative relevance factor is adjusted for location variations. As with name variations, an algorithm may be used to derive a location match percentage. If the match percentage is less than 100%, then the variation from 100% is deducted from the cumulative relevance factor up to a maximum of 20 points for platted locations and a maximum of 15 points for unplatted locations. If the subject document has no locations, then use locations from documents it references and continue the process until locations are found in the reference chain. If no locations are ever encountered, deduct 3 points from the cumulative relevance factor.

The process continues at block 320. At this location the cumulative relevance factor is further adjusted for address variation. If the subject document has no addresses, make no adjustment. If the user did supply addresses, then derive a maximum match percentage and deduct its variation from 100% from the cumulative relevance factor to a maximum of 20 points.

The process continues at block 322 where the cumulative relevance factor is adjusted for parcel mismatches. If the subject document has a parcel identification, then allow an adjustment. If the subject document has parcel identifiers, then derive a maximum match percentage and deduct the amount by which it varies from 100% from the cumulative relevance factor to a maximum of 20 points. If, however, the subject document is a deed and granted by a subdivision developer, deduct a maximum of 10 points. If the document is a mortgage and attaches to a deed granted by a subdivision developer, deduct a maximum of 10 points.

The process continues at block 324. At this location, if the documents associates to a good stop 7 points is added to the cumulative relevance factor.

The process continues at block 326. At this location, if the document is a mortgage, mortgage modification, an assignment of a mortgage associated to a deed, and/or the like, add 6 points to the cumulative relevance factor.

The process continues at block 328. At this location, adjustments are made for the document type of the subject document. Many examples are possible in this adjustment category. As an example, if the document type is a subdivision map, 20 points may be added to the cumulative relevance factor. In other examples, points may be added or deducted if the subject document is a marriage license, a divorce certificate, an encumbrance, or the like. Many other examples are possible.

The process continues at block 330. Here, the cumulative relevance factor is adjusted depending on the relationship between the record date of the document and any good stops. If there are no good stop organizational links, then no adjustments are made. If, however, there are good stop organization links, then the cumulative relevance factor is reduced in relation to the number of good stops coming after in time the record date of the subject document. In some embodiments, the cumulative relevance factor is reduced by 10 for the first good stop the subject document antedates, 30 for the second, 50 for the third, and so on following a predetermined progression.

At block 332, the cumulative relevance factor is adjusted based on reference document relevance differences. In some embodiments, this step must be performed after all relevance numbers are computed. If the subject document references another document, the subject document's cumulative relevance factor is adjusted by half the difference between its cumulative relevance factor and the referenced document's cumulative relevance factor. The adjustment could be negative.

At block 334, other adjustments may be made to the cumulative relevance factor. These may include, for example:

Name attributes: Given that doc A has a name with an attribute "estate" and doc B has the same name, but lacks the "estate" attribute, a deduction could be made. Name attributes include: Estate, trust, personal representative, government official (sheriff, clerk, trustee), railroad, mortgage bank and others.

Sectional land: Doc A posts to NW ¼ of SE ¼ of NE ¼ of section 22. Doc B posts just to SE ¼ of NE ¼ of section 22, hence they do overlap, but are not exact matches. A deduction could be made.

M/B: The cadastral space (a derived polygon sourced from the Metes and Bounds legal text of documents) of doc A and doc B overlap (to some percentage) or are mutually disjoint. A deduction could be made for any percentage difference less than some threshold, 90%, for example.

Replats: Replats form a chain. Different documents land in the replat chain. By working up and down the chain, it is possible to pin two documents to either sectional or M/B cadastral space. The question is whether the docs overlap, geometrically, by following the replat chain. Again, a percentage threshold is used and a deduction could be made if the docs differ geometrically.

At block 336, if the cumulative relevance factor is outside the range of 0 to 100, it is adjusted to either 0 or 100, depending on whether it is less than 0 or greater than 100, respectively.

Those skilled in the art will appreciate that alternative methods according to embodiments of the invention may include more or fewer steps and that the steps described herein may be performed in different orders than that described with respect to this exemplary specific embodiment.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to real property records searching specifically or property records searching generally. For example, the present invention may be used to search corporate filings, license records, and the like and the derivation of relevance factors associated therewith. Accordingly, the above description should not be taken as limiting the scope of the invention, which is defined in the following claims.

What is claimed is:

1. A method of evaluating a particular document relating to property, the method comprising:

from a set of pre-selected documents, selecting the particular document, wherein each pre-selected document has associated therewith one or more search linkages that identify how the pre-selected document was selected, using user-supplied inputs, from a larger set of documents relating to property and wherein the set of pre-selected documents also have associated therewith one or more organizational linkages, each of which organizational linkages identifies a relationship between at least two pre-selected documents;

using the one or more search linkages associated with the particular document to determine a relevance factor associated with the document, wherein using the one or more search linkages associated with the particular document to determine a relevance factor associated with the document comprises determining a baseline relevance factor and thereafter adjusting the relevance factor based on one or more specific comparisons;

further comprising using the one or more organizational linkages to determine the relevance factor associated with the particular document, wherein using the one or more organizational linkages to determine the relevance factor associated with the particular document comprises adjusting a baseline relevance factor if a record date of the particular document predates a specific good stop associated with the document; and displaying to a user information relating to the document, wherein the information includes the relevance factor.

2. The method of claim 1, wherein determining a baseline relevance factor comprises assigning a relevance factor of 100 if a location associated with the particular document matches a location supplied by a user.

3. The method of claim 1, wherein determining a baseline relevance factor comprises assigning a relevance factor of 100 if three or more search linkages exist with respect to the particular document.

4. The method of claim 1, wherein determining a baseline relevance factor comprises assigning a relevance factor of 92 if two search linkages exist with respect to the particular document.

5. The method of claim 1, wherein determining a baseline relevance factor comprises assigning a relevance factor of 84.

6. The method of claim 1, wherein adjusting the relevance factor based on one or more specific comparisons comprises adjusting the baseline relevance factor based on a comparison between a name associated with the particular document and a name supplied by a user.

7. The method of claim 1, wherein adjusting the relevance factor based on one or more specific comparisons comprises adjusting the baseline relevance factor based on a comparison between a location associated with the particular document and a location supplied by a user.

8. The method of claim 1, wherein adjusting the relevance factor based on one or more specific comparisons comprises adjusting the baseline relevance factor based on a comparison between an address associated with the particular document and an address supplied by a user.

9. The method of claim 1, wherein adjusting the relevance factor based on one or more specific comparisons comprises adjusting the baseline relevance factor based on a comparison between a parcel associated with the particular document and a parcel supplied by a user.

10. The method of claim 1, wherein adjusting the relevance factor based on one or more specific comparisons comprises adjusting the baseline relevance factor if the particular document associates to a good stop.

11. The method of claim 1, wherein adjusting the relevance factor based on one or more specific comparisons comprises adjusting the baseline relevance factor if the particular document is a mortgage or an assignment of a mortgage associated to a deed.

12. The method of claim 1, wherein adjusting the relevance factor based on one or more specific comparisons comprises adjusting the baseline relevance factor depending upon a type of document that is the particular document.

13. A method of selecting documents for inclusion in a title policy or a title abstract, comprising:
receiving inputs from a user;
from a set of documents relating to property, using the inputs to select potentially relevant documents, wherein using the inputs to select potentially relevant documents creates one or more search linkages associated with each potentially relevant document, each search linkage relating to a selection method by which the potentially relevant document was selected, wherein using the inputs to select potentially relevant documents creates a set of potentially relevant documents;
organizing the set of potentially relevant documents by searching for relationships between documents in the set, thereby creating one or more organizational linkages, each of which organizational linkages identifies a relationship between at least two documents in the set;
for a particular document from the set of potentially relevant documents, using one or more search linkages associated with the particular document to determine a relevance factor relating to the particular document, wherein using one or more search linkages associated with the particular document to determine a relevance factor associated with the document comprises determining a baseline relevance factor and thereafter adjusting the relevance factor based on one or more specific comparisons;
using the one or more organizational linkages in determining the relevance factor associated with the particular document, wherein using the one or more organizational linkages to determine the relevance factor associated with the particular document comprises adjusting a baseline relevance factor if a record date of the particular document predates a specific good stop associated with the document; and
using the relevance factor to determine whether to include the particular document on a title abstract or title policy.

14. The method of claim 13, wherein determining a baseline relevance factor comprises assigning a relevance factor of 100 if a location associated with the particular document matches a location supplied by a user.

15. The method of claim 13, wherein determining a baseline relevance factor comprises assigning a relevance factor of 100 if three or more search linkages exist with respect to the particular document.

16. The method of claim 13, wherein determining a baseline relevance factor comprises assigning a relevance factor of 92 if two search linkages exist with respect to the particular document.

17. The method of claim 13, wherein determining a baseline relevance factor comprises assigning a relevance factor of 84.

18. The method of claim 13, wherein adjusting the relevance factor based on one or more specific comparisons comprises adjusting the baseline relevance factor based on a comparison between a name associated with the particular document and a name supplied by a user.

19. The method of claim 13, wherein adjusting the relevance factor based on one or more specific comparisons comprises adjusting the baseline relevance factor based on a comparison between a location associated with the particular document and a location supplied by a user.

20. The method of claim 13, wherein adjusting the relevance factor based on one or more specific comparisons comprises adjusting the baseline relevance factor based on a comparison between an address associated with the particular document and an address supplied by a user.

21. The method of claim 13, wherein adjusting the relevance factor based on one or more specific comparisons comprises adjusting the baseline relevance factor based on a comparison between a parcel associated with the particular document and a parcel supplied by a user.

22. The method of claim 13, wherein adjusting the relevance factor based on one or more specific comparisons comprises adjusting the baseline relevance factor if the particular document associates to a good stop.

23. The method of claim 13, wherein adjusting the relevance factor based on one or more specific comparisons comprises adjusting the baseline relevance factor if the particular document is a mortgage or an assignment of a mortgage associated to a deed.

24. The method of claim 13, wherein adjusting the relevance factor based on one or more specific comparisons comprises adjusting the baseline relevance factor depending upon a type of document that is the particular document.

25. A method of selecting documents for inclusion in a report relating to property, comprising:
at a host computer system, receiving user inputs relating to a property records search;
using the user inputs to select potentially relevant documents from a property records database, each selection of a potentially relevant document thereby creating a search linkage that identifies a selection method by which the potentially relevant document was selected;
evaluating the potentially relevant documents to determine relationships between one or more documents, each determination of a relationship resulting in an organizational linkage that identifies the relationship;
using the search linkages and the organizational linkages to calculate a relevance factor for each potentially relevant document, wherein using the search linkages associated with the particular document to determine a relevance factor associated with the document comprises determining a baseline relevance factor and thereafter adjusting the relevance factor based on one or more specific comparisons and wherein using the organizational linkages to determine the relevance factor associated with the particular document comprises adjusting a baseline relevance factor if a record date of the particular document predates a specific good stop associated with the document;

for each potentially relevant document, using the relevance factor to determine whether to include the potentially relevant document in the report; and outputting the report.

26. The method of claim 25, wherein the report comprises a title policy.

27. The method of claim 25, wherein the report comprises a title abstract.

28. The method of claim 25, wherein using the search linkages and the organizational linkages to calculate a relevance factor for each potentially relevant document comprises determining a baseline relevance factor and thereafter adjusting the relevance factor based on one or more specific comparisons.

29. The method of claim 28, wherein determining a baseline relevance factor comprises assigning a relevance factor of 100 if a location associated with the particular document matches a location supplied by a user.

30. The method of claim 28, wherein determining a baseline relevance factor comprises assigning a relevance factor of 100 if three or more search linkages exist with respect to the particular document.

31. The method of claim 28, wherein determining a baseline relevance factor comprises assigning a relevance factor of 92 if two search linkages exist with respect to the particular document.

32. The method of claim 28, wherein determining a baseline relevance factor comprises assigning a relevance factor of 84.

33. The method of claim 28, wherein adjusting the relevance factor based on one or more specific comparisons comprises adjusting the baseline relevance factor based on a comparison between a name associated with the particular document and a name supplied by a user.

34. The method of claim 28, wherein adjusting the relevance factor based on one or more specific comparisons comprises adjusting the baseline relevance factor based on a comparison between a location associated with the particular document and a location supplied by a user.

35. The method of claim 28, wherein adjusting the relevance factor based on one or more specific comparisons comprises adjusting the baseline relevance factor based on a comparison between an address associated with the particular document and an address supplied by a user.

36. The method of claim 28, wherein adjusting the relevance factor based on one or more specific comparisons comprises adjusting the baseline relevance factor based on a comparison between a parcel associated with the particular document and a parcel supplied by a user.

37. The method of claim 28, wherein adjusting the relevance factor based on one or more specific comparisons comprises adjusting the baseline relevance factor if the particular document associates to a good stop.

38. The method of claim 28, wherein adjusting the relevance factor based on one or more specific comparisons comprises adjusting the baseline relevance factor if the particular document is a mortgage or an assignment of a mortgage associated to a deed.

39. The method of claim 28, wherein adjusting the relevance factor based on one or more specific comparisons comprises adjusting the baseline relevance factor depending upon a type of document that is the particular document.

40. The method of claim 28, wherein adjusting the relevance factor based on one or more specific comparisons comprises adjusting the baseline relevance factor if a record date of the particular document predates a specific good stop associated with the document.

41. A system for generating reports relating to property, comprising:
a host computer system;
a database of property records;
means for receiving inputs from a user; and
means for outputting the report to the user;
wherein the host computer system is programmed to:
a) receive user inputs relating to a property records search;
b) use the user inputs to select potentially relevant documents from a property records database, wherein each selection of a potentially relevant document creates a search linkage that identifies a selection method by which the potentially relevant document was selected;
c) evaluate the potentially relevant documents to determine relationships between one or more documents, wherein each determination of a relationship results in an organizational linkage that identifies the relationship;
d) use the search linkages and the organizational linkages to calculate a relevance factor for each potentially relevant document, wherein using the search linkages to calculate a relevance factor for each potentially relevant document comprises determining a baseline relevance factor and thereafter adjusting the relevance factor based on one or more specific comparisons and wherein using the organizational linkages to calculate a relevance factor for each potentially relevant document comprises adjusting a baseline relevance factor if a record date of the particular document predates a specific good stop associated with the document;
e) for each potentially relevant document, use the relevance factor to determine whether to include the potentially relevant document in the report; and
f) output the report.

42. A method of selecting documents for inclusion in a report relating to property, comprising:
a step for receiving user inputs relating to a property records search;
a step for using the user inputs to select potentially relevant documents from a property records database, each selection of a potentially relevant document thereby creating a search linkage that identifies a selection method by which the potentially relevant document was selected;
a step for evaluating the potentially relevant documents to determine relationships between one or more documents, each determination of a relationship resulting in an organizational linkage that identifies the relationship;
a step for using the search linkages and the organizational linkages to calculate a relevance factor for each potentially relevant document, wherein using the search linkages to calculate a relevance factor for each potentially relevant document comprises determining a baseline relevance factor and thereafter adjusting the relevance factor based on one or more specific comparisons and wherein using the organizational linkages to calculate a relevance factor for each potentially relevant document comprises adjusting a baseline relevance factor if a record date of the particular document predates a specific good stop associated with the document;

a step for each potentially relevant document, using the relevance factor to determine whether to include the potentially relevant document in the report; and a step for outputting the report.

43. A computer-readable medium having stored thereon computer-executable instruction for performing a method of selecting documents for inclusion in a report relating to property, the method comprising:

receiving user inputs relating to a property records search;

using the user inputs to select potentially relevant documents from a property records database, each selection of a potentially relevant document thereby creating a search linkage that identifies a selection method by which the potentially relevant document was selected;

evaluating the potentially relevant documents to determine relationships between one or more documents, each determination of a relationship resulting in an organizational linkage that identifies the relationship;

using the search linkages and the organizational linkages to calculate a relevance factor for each potentially relevant document, wherein using the search linkages to calculate a relevance factor for each potentially relevant document comprises determining a baseline relevance factor and thereafter adjusting the relevance factor based on one or more specific comparisons and wherein using the organizational linkages to calculate a relevance factor for each potentially relevant document comprises adjusting a baseline relevance factor if a record date of the particular document predates a specific good stop associated with the document;

for each potentially relevant document, using the relevance factor to determine whether to include the potentially relevant document in the report; and outputting the report.

* * * * *